April 21, 1925.  
J. HORRIDGE  
COMBING MACHINE  
Filed June 6, 1922

1,534,781

2 Sheets-Sheet 1

INVENTOR  
James Horridge  
By Wm Wallace White  
ATT'Y.

April 21, 1925.  J. HORRIDGE  1,534,781
COMBING MACHINE
Filed June 6, 1922  2 Sheets-Sheet 2

INVENTOR:
James Horridge
By Wm Wallace White
ATTY.

Patented Apr. 21, 1925.

1,534,781

UNITED STATES PATENT OFFICE.

JAMES HORRIDGE, OF BOLTON, ENGLAND, ASSIGNOR TO JOHN HETHERINGTON AND SONS LIMITED, OF MANCHESTER, LANCASTER, ENGLAND.

COMBING MACHINE.

Application filed June 6, 1922. Serial No. 566,433.

*To all whom it may concern:*

Be it known that I, JAMES HORRIDGE, a subject of the King of Great Britain, residing at Bolton, in the county of Lancaster, England, have invented new and useful Improvements in or Relating to Combing Machines, of which the following is a specification.

The invention relates to improvements in or relating to combing machines of that type in which a fan or aspirator is employed for removing the waste from the cylinder brushes.

In combing machines of this type it has been usual for the fan or aspirator to stop when the combing elements of the machine are stopped and it was found in practice to be desirable that the fan or aspirator should continue running when the machine came to rest.

With this object in view various arrangements of mechanism have heretofore been proposed generally characterized by the employment of clutches in combination with a single pair of fast and loose pulleys and suitable levers and connections.

Now the object of the present invention is to attain the same end by the provision of an improved and more simple arrangement of mechanism for continuously driving the fan or aspirator even though the machine be at rest.

For the purpose of this invention the usual fast and loose pulleys are employed and upon the loose pulley is mounted, cast or formed integral therewith a sprocket or chain wheel or ring over which the fan driving chain is adapted to pass.

Adjacent the loose pulley and keyed with the shaft is a ratchet wheel and upon said loose pulley is a spring influenced pawl adapted to engage the teeth of the ratchet wheel.

In the accompanying drawings—

Figure 1:
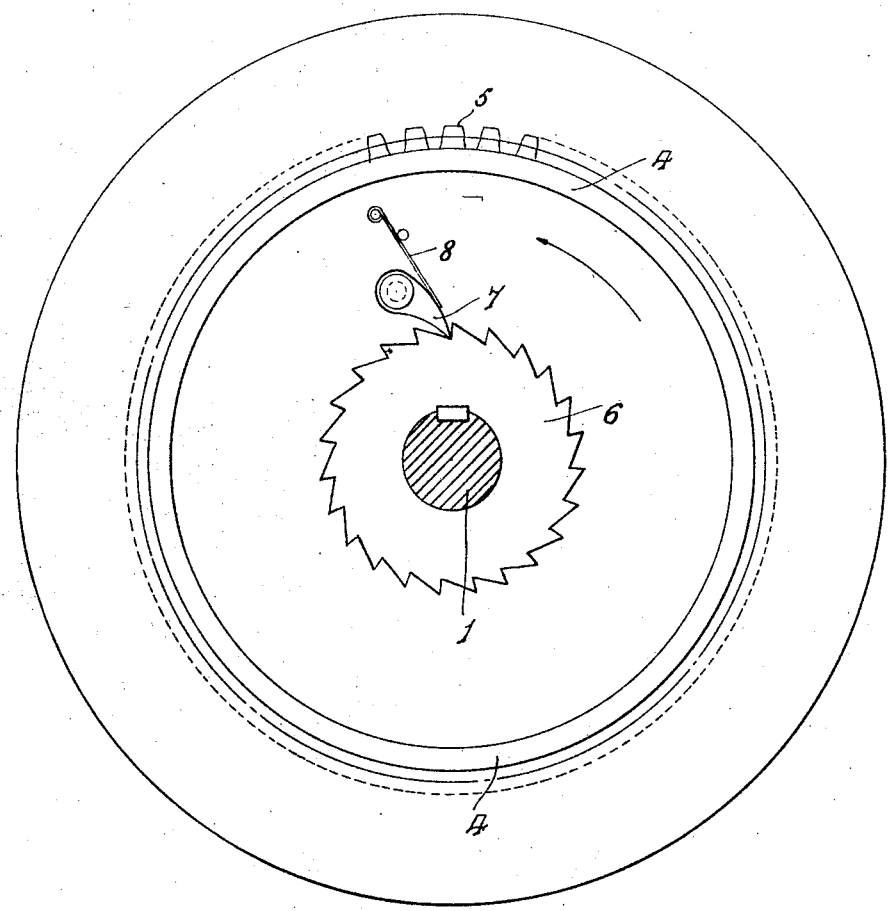
Figure 2:
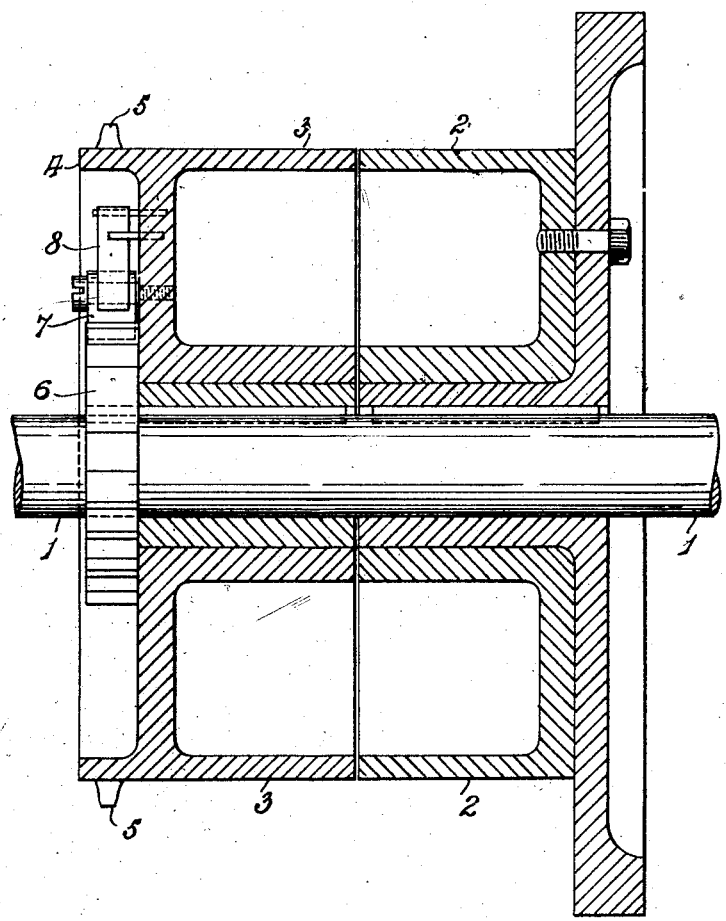

Figure 1 is a side elevation of a device constructed according to the present invention and Figure 2 is an end view thereof partly in section.

Referring to the drawings—

1 represents the driving shaft, 2 represents the fast pulley and 3 represents the loose pulley.

The loose pulley has cast therewith a ring 4 upon the periphery of which are teeth 5 over which the fan driving chain passes; or instead of being cast with the loose pulley 3 the ring 4 might be separate therefrom and fixed therewith by any suitable means.

Mounted upon the shaft 1 and keyed therewith is a ratchet wheel 6, and pivotally mounted upon the loose pulley 3 is a pawl 7 adapted to engage the teeth of the ratchet wheel 6 and said pawl 7 is kept up to its work by a spring 8 in the well known manner, the direction of drive being indicated by the arrow in Figure 1.

Assuming the driving belt (not shown) to be upon the fast pulley 2 the ring 4 and consequently the fan is driven from said pulley 2 through the shaft 1, ratchet wheel 6, pawl 7 and loose pulley 3 but upon the belt being shifted on to the loose pulley 3 the machine will stop but the ring 4 and consequently the fan will continue to be driven by the driving belt (not shown).

It will be obvious that the details of construction of the device may be modified without departing from the principle of the invention; for example the teeth 5 might be dispensed with and the ring 4 formed to receive a belt.

What I claim as my invention and desire to secure by Letters Patent of the United States is:—

A motion transmitting device, comprising, in combination, a shaft, a pulley fast to said shaft for transmitting motion thereto, a ratchet secured to said shaft for rotation therewith, a pulley loosely mounted on said shaft between said ratchet and fast pulley, said fast and loose pulleys being of the same diameter thereby to permit shifting of a belt from one to the other, said loose pulley having a pawl for engaging said ratchet whereby motion is transmitted by the fast pulley to said loose pulley by means of said shaft and ratchet, and means carried by said loose pulley for transmitting motion therefrom.

In testimony whereof I have signed my name to this specification.

JAMES HORRIDGE.